United States Patent [19]

Morse et al.

[11] 3,860,733

[45] Jan. 14, 1975

[54] MICROENCAPSULATED PRODUCT

[75] Inventors: Lewis D. Morse, Princeton; Paul A. Hammes, Westfield, both of N.J.

[73] Assignee: Merck & Co., Inc., Rahway, N.J.

[22] Filed: July 31, 1972

[21] Appl. No.: 276,870

Related U.S. Application Data

[63] Continuation-in-part of Ser. No. 207,575, Dec. 13, 1971, abandoned, which is a continuation-in-part of Ser. No. 30,969, April 22, 1970, abandoned.

[52] U.S. Cl.................. 426/302, 426/89, 426/350, 424/35, 252/316, 426/96
[51] Int. Cl............................................... A23l 1/34
[58] Field of Search ............ 99/111, 71; 424/33, 35, 424/83; 130/2; 252/316; 426/72, 74, 89, 350, 302

[56] References Cited
UNITED STATES PATENTS

| 3,041,289 | 6/1972 | Katchen et al...................... 252/316 |
| 3,341,416 | 9/1967 | Anderson et al. ..................... 424/35 |
| 3,488,418 | 1/1970 | Holliday et al. ...................... 424/35 |
| 3,531,418 | 9/1970 | Fanger et al........................ 252/316 |

*Primary Examiner*—A. Louis Monacell
*Assistant Examiner*—Robert A. Yoncoskie
*Attorney, Agent, or Firm*—Martin L. Katz; Frank M. Mahon; Harry E. Westlake, Jr.

[57] ABSTRACT

Mixtures of discrete vitamins, minerals and other nutrients are maintained in a uniform distribution by microencapsulation.

10 Claims, No Drawings

MICROENCAPSULATED PRODUCT

This application is a continuation-in-part of Ser. No. 207,575, filed Dec. 13, 1971, now abandoned, which is a continuation-in-part of Ser. No. 30,969, filed Apr. 22, 1970, now abandoned.

This invention relates to multivitamin and nutrient preparations and especially to a particulate product in the form of a microcapsule, each containing therein substantially the exact relative proportions of these agents in which they are combined. The microcapsules are particles in which are enveloped as substantially uniform blend of the vitamins and other nutrients, such as iron or other minerals which have been initially mixed together in bulk form.

The microcapsules of this invention have important use in making multivitamin-mineral tablets. The ordinary vitamin-mineral mixes which are used for making compressed tablets lack certain necessary properties for getting a desirable product. The mechanical strength of the tablet is low. The flow rate of the mixture from the hopper to the tabletting die can be erratic enough that some die holes may not fill properly. The product of the present invention has improved uniformity of flow and produces a tablet which has high mechanical strength but still releases its active material.

These vitamin-mineral blends are also used in the food industry to fortify baked goods, for instance, and as coatings on breakfast cereals. In such uses it is important that granular, crystalline and/or powder-textured blends of vitamins and/or minerals be uniform from one portion of a batch to another, and from batch to batch. It is equally important to avoid "classification" or stratification of constituents of the blend as the blend is unloaded from production machinery, during packaging, shipping and other handling. One object of this invention is to provide initial and lasting uniformity of vitamin or vitamin-mineral mixes.

The state of the art of blending vitamins and vitamins with minerals includes methods of mixing, careful matching of constituent ingredient particle sizes, consideration of specific gravity differences among ingredients and sequences such a mix-mill-mix. These are time and labor consuming procedures. Classification of particles in shipping and handling is a constant difficulty.

Attempts have been made in prior practices to solve the problem of tablet strength by granulating vitamin and/or mineral particles. Typical binders used for this purpose in the past include solutions of glucose, gum Arabic, gelatin, sucrose, starch, water, alcohol, methylcellulose, and shellac. Such procedures and ingredients lead to granules that can be tabletted. Reproducibility is poor, however, in fluidity of particles and mechanical strength of the tablets. Also discoloration of the vitamin and minerals sometimes results.

In the past, as shown by Jensen U.S. Pat. No. 3,265,629 more than one substance has been enclosed in a single enveloping wall but those substances are joined or attached to each other by a spraying operation so that the wall must surround the adhering substances. This has now been found to not be necessary as with the preseent invention, the nutrient particles are used as separate, discrete, unattached fragments and they are enclosed as such by the microencapsulating wall.

The feature of the present invention is the microencapsulation of the vitamin mixes and vitamin-mineral mixes employing the known arts of polymer/polymer incompatibility coacervation, and film formation from polymer solution by loss of solvent as embodied in U.S. Pat. Nos. 2,800,457, 3,106,308, 3,155,590, and 3,495,988, and British Pat. Nos. 965,070, 1,012,658, and 1,016,839. Other microencapsulation processes which may be used are disclosed in Netherlands Pat. No. 6,611,661 and in French Pat. No. 1,453,745.

Suitable solvents for the coating solution include cyclohexane and hexane. The ethycellulose should preferably have a 47.5 percent ethoxyl content and a 100 cps. viscosity but a range of 45.0–50 percent ethoxyl content and a 95–110 cps. viscosity is permissible. The viscosity is measured as known in the art, at 25°C. as a 5 percent by weight solution in a 80:20 toluene-ethanol mixture. On the basis of 100 grams of cyclohexane there can be added 1 to 5 grams of the ethylcellulose to thereby vary the thickness of the encapsulating film.

The polyethylene preferably used should have a molecular weight of between 5,000 to 10,000 (an average of 7,000 is preferred) and from 1 to 5 grams of it should be added per 100 grams of the cyclohexane.

Also suitable are microencapsulation techniques which utilize a single polymeric material and solvents therefor as described in U.S. Pat. No. 3,531,418 in which case a system of ethyl cellulose and a solvent such as cyclohexane or hexane or mixtures thereof is used.

The vitamin, mineral and nutrient particles to be blended together include one or more water soluble vitamins such as ascorbic acid, folacin, niacin, riboflavin, thiamin, vitamin $B_6$, vitamin $B_{12}$, and esters, salts and amides thereof, and one or more minerals such as those containing calcium, phosphorous, iodine, iron and magnesium which are present in multivitamin-mineral preparations in the following daily dosage ranges:

| SUBSTANCE | AMOUNT |
|---|---|
| ascorbic acid | 25–75 mg |
| folacin | 0.01–1 mg |
| niacin | 2–25 mg |
| riboflavin | 0.1–2.5 mg |
| thiamin | 0.1–2.5 mg |
| vitamin $B_6$ | 0.1–3 mg |
| vitamin $B_{12}$ | 0.1–10.0 $\mu$g |
| calcium | 0.1–2.0 g |
| phosphorous | 0.1–2.0 g |
| iodine | 10–200 $\mu$g |
| iron | 5–50 mg |
| magnesium | 25–500 mg | these particles (hereinafter referred to as nutrients) are preferably microatomized so that 98 percent of them are under 50 microns in size. The particles can be up to 100 microns in size and some of them in the 50 to 100 micron range will be individually encapsulated but some of them will be trapped with other particles in a single capsule. Particles above 100 microns in size will almost all be individually microencapsulated. The different ingredients can each have quite a different size below 100 microns and preferably below 50 microns as the polymer solution tends to equally suspend them all in a uniform distribution until the microencapsulation traps them in this unform blend.

During the cooling step the ethycellulose starts to form an encapsulating wall around minute agglomerates or clumps of the vitamin-mineral-nutrient ingredients while they maintain substantially their original blended ratio. In many of the microcapsules the vitamin-mineral-nutrient relative ratio will be exactly that of the original mixture and in any event several of the microcapsules when randomly grouped together will have a composite ratio which corresponds to the original overall mixture ratio.

Representative examples are the following:

EXAMPLE 1

The following were dispersed in 300 gm. cyclohexane, using an upthrust turbine impellor.

6 grm Ethylcellulose (47.5 percent ethoxyl content by weight, viscosity 100 cps. as 5 percent solution in 80:20 toluene: ethanol at 25°C.
6 gm. Polyethylene granules (molecular weight about 7,000).
44.1 gm. Niacinamide (325 mesh).
5.5 gm. Riboflavin (325 mesh).
4.4 mg. Thiamine mononitrate (325 mesh).

Stir the system with heating. At 80°C. both the ethycellulose and the polyethylene had dissolved in the cyclohexane.

Stirring was continued while the system was allowed to cool. As the temperature dropped, solvated ethylcellulose developed as a separate phase due to the presence of the polyethylene. The solvated polyethylene, distributed in the cyclohexane as droplets by the turbine, tended to wet small clumps of vitamin mix and to envelop them. As the temperature dropped further, the ethycellulose lost solvent and developed into solid encapsulating walls. The continuous phase, cyclohexane, contained minute particles of polyethylene. At 45°C. the walls had stopped building up. Cold cyclohexane was added to reduce the temperature still further. The supernatant cyclohexane was poured off together with the minute particles of polyethylene. The microcapsules were resuspended in clean cyclohexane. This was continued until the capsules were washed clean of polyethylene and other debris. The capsules were spread to dry. The resultant capsules with a 90 percent vitamin content, when screened through standard Taylor sieves, had the following size distribution (wt.%):

| | |
|---|---|
| +20 mesh | 3.2 |
| −20/+35 | 5.4 |
| −35/+80 | 71.9 |
| −80/+100 | 8.1 |
| −100 | 11.4 |

The ratio by weight of vitamins processed was 1.00 niacinamide: 0.12 riboflavin: 0.10 thiamine mononitrate. The ratio of vitamins determined in 2 gram sample of microcapsules was 1.00: 0.12: 0.10.

Niacinamide and thiamine are bitter. Laboratory personnel found no bitter taste when they put several capsules on the tongue and swallowed them.

EXAMPLE 2

Capsules were prepared successfully as in Example 1, but the following were dispersed in 300 gm. cyclohexane, in addition to the 6 gm. Ethycellulose (this becomes the external phase, or capsule wall) and the 6 gm. polyethylene (this is the phasing-out polymer):

3.3 gm. Thiamine mononitrate (325 mesh)
3.3 gm. Riboflavin (325 mesh)
1.6 gm. Pyridoxine hydrochloride (325 mesh)
32.9 gm. Niacinamide (325 mesh)
68.9 gm. Sodium ascorbate (325 mesh)

The above nutrients become the internal phase, or encapsulated material.

The resultant capsules with a 95% vitamin content, when screened through standard Taylor sieves, had the following size distribution (wt.%):

| | |
|---|---|
| +12 mesh | 0.19 |
| −12/+20 | 0.47 |
| −20/+60 | 30.59 |
| −60/+80 | 49.20 |
| −80/+100 | 10.83 |
| −100/+200 | 8.72 |
| −200 | Trace |

EXAMPLE 3

Capsules were prepared successfully as in Example 1, but the following internal phase was used:

26 gm. Thiamine mononitrate
21 gm. Riboflavin
21 gm. Pyridoxine hydrochloride
37 gm. Niacinamide The resultant capsules with a 95% vitamin content, when screened through standard Taylor sieves, had the following size distribution (wt.%):

| | |
|---|---|
| + 12 mesh | 0.4 |
| −12/+ 16 | 3.4 |
| −16/+ 20 | 1.7 |
| −20/+ 30 | 1.4 |
| −30/+ 40 | 0.9 |
| −40/+ 60 | 2.0 |
| −60/+ 80 | 3.7 |
| −80/+ 100 | 15.4 |
| −100/+ 140 | 37.9 |
| −140/+ 200 | 29.3 |
| −200/+ 325 | 3.6 |
| −325 | 0.3 |

EXAMPLE 4

Capsules were prepared successfully as in Example 1, but the following internal phase was used:

3.3 Gm. Thiamine mononitrate
3.3 Gm. Riboflavin
1.6 Gm. Pyridoxine hydrochloride
32.9 Gm. Niacinamide
68.9 Gm. Sodium ascorbate
1.65 Gm. Cobalamine Concentrate Type S 100. (This is crystalline Vitamin $B_{12}$ diluted 100 μg/gm. with mannitol).

The resultant capsules had an internal phase content of 95 percent. This formulation was of particular interest because of the small amount of Vitamin $B_{12}$ in the blend. This is a good measure of the efficiency of the distribution of ingredients. The theoretical quantity of $B_{12}$ in the capsules was 0.014 mg./gm. capsules. The amount found was 0.012 mg./gm.

EXAMPLE 5

An eight inch diameter stainless steel kettle, with 4 baffles was charged with 1500 gm. cyclohexane, 30 gm. ethylcellulose (of the type described in Example 1), and 30 gm. polyethylene (of the type described in Example 1). The system was stirred at 220 rpm with a two inch diameter turbine impellor, heating to 78°C. At 78°C. the following blend was added:

4.34 Gm. Riboflavin
7.17 Gm. Thiamine hydrochloride 51.70 Gm. Niacinamide
486.80 Gm Ferrous sulfate dried.

The system was allowed to cool to 45°C., and processed further as in Example 1. The resultant capsules had an internal phase content of 95 percent, and a Taylor sieve analysis (wt.%) as follows:

| | | |
|---|---|---|
| +12 | = | 0.24 |
| −12/+30 | = | 1.47 |
| −30/+42 | = | 2.62 |
| −42/+100 | = | 30.80 |
| −100/+150 | = | 37.30 |
| −150/+200 | = | 18.90 |
| −200 | = | 8.60 |

Note that the ingredients include ferrous sulfate, a nutrient that is not a vitamin. These are multi-component capsules. The term multi-component is used as distinct from multi-vitamin.

EXAMPLE 6

The −40/+100 mesh fraction of microcapsules prepared in Example 5 were compressed on a Manesty Beta Press using 10/32 inch S.C. punches. No lubricant, excipient or binder were added to the microcapsules.

Resultant tablets weighed 200 mg. and had a Strong-Cobb hardness of 22.0 kg. Friability (Wollish Friabilator) loss in 4 minutes was 0.002 gm; in 30 minutes, 0.007 gm.

Tablets prepared with the −100/+150 mesh fractions had a hardness of 21.8 kg., weight 200 mg., and a friability loss in 30 minutes of 0.0266 grams.

Tablets prepared with the −200 mesh fraction had a weight of 199 mg., a hardness of 22.3 kg. and friability loss in 30 minutes of 0.0218 gram.

These tablets agitated in simulated gastric fluid at 37°C. would release 38% of the internal phase in one hour and the balance during the second hour.

This example demonstrates an ultimate in direct compressibility. Not one ingredient had to be added to the multi-ingredient microcapsules. The resultant capsules demonstrated good hardness and very low friability.

EXAMPLE 7

The −35/+80 mesh fraction of microcapsules prepared in Example 1 were included in a commercial multivitamin-mineral preparation having the composition:

| | |
|---|---|
| Microcapsules of Example 1 | 1,006.8 gm. |
| Vitamin A/D₂ 500 μ/50 μ | 100.0 gm. |
| Vitamin A Acetate | 450.0 gm. |
| *Thiamine Mononitrate | 36.5 gm. |
| *Riboflavin | 12.4 gm. |
| MERPRESS(R) (Niacinamide: ascorbic acid, 1:3) | 1,006.8 gm. |
| Sodium ascorbate | 1,530.0 gm. |
| Calcium pantothenate | 250.0 gm. |
| Pyridoxine hydrochloride | 60.0 gm. |
| STABICOTE(R) (Vit. B₁₂, 1% in gelatin | 6.25 gm. |
| Vitamin E Acid Succinate | 136.5 gm. |
| Carnauba Wax (−100 mesh) | 240.0 gm. |
| AVICEL(R) | 317.5 gm. |
| SYLOID(R), Grade 68 | 27.0 gm. |
| Stearic Acid | 72.5 gm. |
| Magnesium Stearate | 20.0 gm. |

*These were added in addition to the amounts included in the microcapsules, to raise the quantities to the precise amount called for in the formula.

The above blend was compressed in a Manesty Beta Press, run at 1000 tablets/minute using a No. 1 capsule shaped punch.

The resultant tablets average 550.5 mg. each and had a thickness of 0.225 inch. They had a very good whiteness. Flow from the hopper to the punch was far superior to a blend containing no microencapsulated material. Strong-Cobb hardness of the tablets was 22.0 kg. Without microencapsulated material in the blend, the Strong-Cobb hardness would be 16–18 kg.

EXAMPLE 8

Microcapsules of Example 2 were included in a commercial multivitamin-mineral preparation having the composition:

| | |
|---|---|
| Microcapsules of Example 2 | 2,570.0 gm. |
| Vitamin A/D₂ 500 μ/50μ | 100.0 gm. |
| Vitamin A Acetate | 450.0 gm. |
| *Thiamine Mononitrate | 36.3 gm. |
| *Riboflavin | 32.55 gm. |
| MERPRESS(R) | 1,240.0 gm. |
| *Niacinamide | 11.1 gm. |
| Calcium Pantothenate | 250.0 gm. |
| *Pyridoxine Hydrochloride | 24.6 gm. |
| STABICOTE(R) 1% | 6.25 gm. |
| Vitamin E Acid Succinate | 136.5 gm. |
| Carnauba Wax (C-100 mesh) | 240.0 gm. |
| AVICEL(R) | 317.5 gm. |
| SYLOID(R), Grade 68 | 27.0 gm. |
| Stearic Acid | 75.25 gm. |
| Magnesium Stearate | 20.0 gm. |

*These were added over and above that included in the microcapsules, to raise the quantities to the precise amount called for in the formula.

The above blend was compressed as in Example 6. The flowability into the dies was more uniform than when the microcapsules were not included. The resultant tablets averaged 555.7 mg. each, had a thickness of 0.220 inch, and a Strong-Cobb hardness of 21.8 kg. This hardness compares favorably with 16–18 kg. that would be expected in a similar blend without microencapsulated material.

EXAMPLE 9

Microcapsules of Example 3 were included in a typical daily vitamin preparation:

| | |
|---|---|
| Microcapsules of Example 3 | 21.0 gm. |
| Cyanocobalamine 0.1% in gelatin | 4.4 gm. |
| MERPRESS(R) | 146.6 gm. |
| Calcium Pantothenate | 10.0 gm. |
| Magnesium Stearate | 6.0 gm. |
| CAB-O-SIL(R) | 2.0 gm. |
| Vitamin A/D 500/₅₀ | 27.0 gm. |
| Spray Dried Lactose | 81.5 gm. |
| AVICEL(R) | 81.5 gm. |

Tablets were prepared by direct compression, using a 10/32 inch deep cup. Resultant tablets averaged 191 mg. and had a Strong-Cobb hardness of 7.2 kg. A comparable preparation with no microencapsulated ingredient would have a hardness of 5 or 6 kg.

EXAMPLE 10

An 8 inch diameter stainless steel kettle, with 4 baffles was charged with:

| | |
|---|---|
| 5 liters | Cyclohexane |
| 36 gm. | Riboflavin, (325 mesh) |
| 36 gm. | Thiamine mononitrate (200 mesh) |
| 428 gm. | Niacinamide (200 mesh) |
| 120 gm. | Ethylcellulose (as in Example 1) |

The system was stirred at 450 rpm with a 3 inch turbine impellor, located 1½ inch from the bottom of the kettle, heating to 78°C. At 80°C. the ethylcellulose had dissolved in the cyclohexane.

Stirring was continued while the system was allowed to cool. As the temperature dropped, solvated ethylcellulose developed as a separate phase due to the poor solvent quality of cyclohexane at lower temperatures. The solvated ethylcellulose distributed in the cyclohexane as droplets by the turbine, tended to wet small clumps of vitamin mix and to envelop them. As the temperature dropped further, the ethylcellulose lost solvent and developed into solid encapsulating walls. At 55°C. the walls had stopped building up. Cold cyclohexane (1 liter) was added to reduce the temperature still further.

The supernatant cyclohexane was poured off. The capsules were dried in a Glatt fluid bed dryer of 5 kilogram capacity.

The resultant capsules were in the 50μ range and had a content as follows:

| | |
|---|---|
| Riboflavin | 5.8 % |
| Thiamine Mononitrate | 5.8 % |
| Niacinamide | 69.0 % |
| Ethylcellulose | 19.4 % |

Riboflavin, thiamine, and niacinamide are bitter. Laboratory personnel found the vitamins to be taste masked when they put several capsules on the tongue and swallowed them.

EXAMPLE 11

Capsules were prepared successfully as in Example 10, but the system was stirred at 300 rpm. The resultant capsules were in the 100–200μ range.

EXAMPLE 12

Capsules were prepared successfully as in Example 11, but the internal phase consisted of:

| | |
|---|---|
| 9 gm. | Riboflavin |
| 9 gm. | Thiamine mononitrate |
| 111 gm. | Niacinamide |
| 371 gm. | Ascorbic Acid (200 mesh) |

The resultant capsules were in the 100–200μ range and had a content as follows:

| | |
|---|---|
| Riboflavin | 1.5 % |
| Thiamine mononitrate | 1.5 % |
| Niacinamide | 17.9 % |
| Ascorbic Acid | 59.8 % |
| Ethylcellulose | 19.4 % |

EXAMPLE 13

Microcapsules were prepared successfully as in Example 10, but the internal phase consisted of:

| | |
|---|---|
| 20 gm. | Riboflavin |
| 20 gm. | Thiamine mononitrate |
| 240 gm. | Niacinamide |
| 800 gm. | Ascorbic Acid |

The system was stirred at 400 rpm. The resultant capsules were in the 100–200μ range and had a content as follows:

| | |
|---|---|
| Riboflavin | 1.7 % |
| Thiamine mononitrate | 1.7 % |
| Niacinamide | 20.0 % |
| Ascorbic Acid | 66.7 % |
| Ethylcellulose | 10.0 % |

EXAMPLE 14

Microcapsules were prepared successfully as in Example 10, but the internal phase consisted of:

| | |
|---|---|
| 12.6 gm. | Riboflavin |
| 12.6 gm. | Thiamine mononitrate |
| 151.1 gm. | Niacinamide |
| 503.7 gm. | Ascorbic Acid |

The system was stirred at 340 rpm. The resultant microcapsules were in the 100–200μ range and had a content as follows:

| | |
|---|---|
| Riboflavin | 1.6 % |
| Thiamine mononitrate | 1.6 % |
| Niacinamide | 18.9 % |
| Ascorbic Acid | 62.9 % |
| Ethylcellulose | 15.0 % |

EXAMPLE 15

Capsules were prepared successfully as in Example 12, but scaled up to a 30 liter kettle, using a 4 inch turbine impellor, and stirring at 950 rpm. The charge to the kettle was:

| | | |
|---|---|---|
| 18.75 | liters | Cyclohexane |
| 34 | gm. | Riboflavin |
| 34 | gm. | Thiamine mononitrate |
| 416 | gm. | Niacinamide |
| 1391 | gm. | Ascorbic Acid |
| 450 | gm. | Ethylcellulose |

The resultant microcapsules were in the 100–200μ range and had a content as follows:

| | |
|---|---|
| Riboflavin | 1.5 % |
| Thiamine mononitrate | 1.5 % |
| Niacinamide | 17.9 % |
| Ascorbic Acid | 59.8 % |
| Ethylcellulose | 19.3 % |

EXAMPLE 16

Capsules were prepared successfully as in Example 10, but the kettle was charged with:

| | | |
|---|---|---|
| 4 | liters | Cyclohexane |
| 60.0 | gm. | Ethylcellulose |
| 690.9 | gm. | Ascorbic Acid |
| 230.3 | gm. | Niacinamide |
| 23.0 | gm. | Riboflavin |
| 28.6 | gm. | Thiamine mononitrate |
| 35.0 | gm. | Pyridoxine hydrochloride |
| 92.2 | gm. | Vitamin $B_{12}$ with mannitol (0.1% active) | stir at 300 rpm.

The resultant capsules, in the 100–200μ range had the following content:

| | |
|---|---|
| Ethylcellulose | 5.2 % |
| Ascorbic acid | 59.6 % |

| | |
|---|---|
| -Continued | |
| Niacinamide | 19.9 % |
| Riboflavin | 2.0 % |
| Thiamine mononitrate | 2.5 % |
| Pyridoxine hydrochloride | 3.0 % |
| Vitamin B₁₂ | 0.008 % |

EXAMPLE 17

83.5 mg of microcapsules from Example 12 were combined with 414.0 gm of a blend of microcrystalline cellulose and corn starch, and 2.5 gm calcium stearate. The blend was screened through a 20 mesh sieve, and compressed at 500 mg, using a Manesty single punch 16/32 F. F. - B. E. open single score.

The resultant tablets were chewable. Laboratory personnel found the vitamins to be taste masked.

EXAMPLE 18

Microcapsules were prepared successfully as in Example 5, but no polyethylene was used.

The resultant microcapsules were in the 100–200$\mu$ range and had a content as follows;

| | |
|---|---|
| Riboflavin | 0.75% |
| Thiamine hydrochloride | 1.24% |
| Niacinamide | 8.191% |
| Iron (as ferrous sulfate) | 26.50% |
| Ethylcellulose | 5.16% |

EXAMPLE 19

Microcapsules were prepared successfully as in Example 18, but employing the following procedure:

1. Hardware

30-Liter fermentation kettle, glass 12 inches diameter, 17 inches high.
Six-bladed down thrust turbine, 5 inches diameter, 1½ inches from bottom of kettle.
Four baffles, stainless steel, 1 inch wide.
Air-drive turbine.
Stainless steel tubing, coiled, for heating and cooling.

2. Disperse in 18.75 liters cyclohexane:

| | |
|---|---|
| 900 gm. | Ethylcellulose (as in Example 1–18, but only 45 cps viscosity) |
| 2539 gm. | Ascorbic Acid |
| 1691 gm. | Niacinamide |
| 405 gm. | Riboflavin |
| 461 gm. | Thiamine Mononitrate |

3. Stirring at a shaft speed of 2,700 rpm. put steam through the coils to heat to 78°–80°C.
4. Stop heating. Pass cold water through coils, cooling the system to 35°C in 1 hour.

| | |
|---|---|
| Resultant microcapsules had a content as follows: | |
| Ascorbic Acid | 62.4 % |
| Niacinamide | 14.9 % |
| Riboflavin | 3.6 % |
| Thiamine Mononitrate | 4.1 % |
| Ethylcellulose | 15.0 % |

EXAMPLE 20

Microcapsules were prepared successfully as in Example 19, but the batch was scaled up, charging the kettle with:

| | |
|---|---|
| 217 lb. | Cyclohexane |
| 6.1 kg. | Ethylcellulose |
| 17.1 kg. | Ascorbic acid |
| 11.4 kg. | Niacinamide |
| 2.7 kg. | Riboflavin |
| 3.1 kg. | Thiamine Mononitrate |

Stirring was at 200 rpm.

The examples show that there can be a wide variation both in the selection of the vitamin-mineral-nutrient ingredients themselves as well as in the amount of each. These selections are dictated by the intended use of the final preparation such as whether it is prophylactic or therapeutic or is directed against a specific deficiency. The variations contemplated are as great as the differences in the vitamin and/or mineral and/or nutrient pharmaceutical and/or food fortification products now available commercially.

The primary advantages of this invention are:

1. Since the blends are slurried in a liquid before encapsulation, mixing is very uniform and efficient.
2. The ingredients are present in the microcapsules in a definite ratio. Thus, no matter how the microcapsules classify, this ratio remains constant.
3. Increased mechanical strength of tablets prepared from the microcapsules.
4. Free-flowing and consistent feed of particles from hopper and press, and to tabletting die.
5. Free-flowing and consistent feed of particles from hopper to a capsule filling machine.
6. No discoloration of particles.
7. Protection of vitamins and minerals from surrounding materials such as moisture of a damp environment.
8. Greater resistance to heat of tabletting compression; capsule wall absorbs heat. Thus, greater stability during compression.
9. Taste masking. Thus, chewable tablets and "pop-in" tablets need no flavor or other taste masking ingredients or coating. However, these can readily be incorporated if desired.
10. Allows for direct compression. Eliminates need for wet or dry granulation.
11. No disintegrant necessary. This is an economic production saving. Leaves more room for other ingredients.
12. Allows for great reduction in the amount of binder necessary for tabletting. This is an economic production saving. The reduction in binder leaves room for larger amounts of flavor or other additives.
13. Enhances resistance to oxidation.
14. Greater uniformity of tablet ingredients (See 1 and 2 above).

In the examples, the size of the nutrient partilces may be of different sizes within the size range mentioned above, instead of all being of 325 gauge size.

In the examples, from about 18 to about 37 grams of the nutrient mixture was added per 100 cc of the cyclohexane. The amount of the nutrient mixture is one factor which determines the thickness of the capsule wall. Up to 40, or possibly 50 grams of the nutrient mixture may be added and still obtain an intact complete capsule wall. This possibility of a wall which is incomplete or too thin can be overcome by increasing the amount of the ethylcellulose in the system, to the upper portion of the range mentioned above.

The amount of the nutrient mixture can be as low as about 1 gram but if it drops substantially below 10 grams the capsule wall may be too thick. This tendency toward an excessively thick wall can be decreased by reducing the amount of the ethylcellulose in the system to the lower portion of the range mentioned above.

The invention also includes edible products which contain the microencapsulated mixture of nutrients produced as disclosed above. These edible products may, for instance, be items such as enriched flour or corn meal or other food made from enriched flour or corn meal, cake mixes or other bakery mixes; and breakfast cereal. Those foods are made by adding the selected amount of microencapsules to the product, this amount being that calculated to supply a person with up to the daily requirement of the nutrients of the average daily serving of the food is consumed.

When the microcapsules are added to foods containing water, the nutrients do not leech out where there is a very low water concentration and/or where most of the water is bound to the food ingredients, such as a gluten in bakery products. The microencapsulation wall itself serves as a barrier to the admittance of water to the interior, in the low water environment of bakery products. Care should be taken to not expose the microcapsules over a prolonged period to water or compositions containing large amounts of water as there is danger that the internal contents will leech out. For instance, in making bread to which the microencapsulated nutrients are added, the microcapsules should be added at as late a stage as possible.

What is claimed is:

1. The method of maintaining the uniformity of a mixture of discrete nutrients while microencapsulating these nutrient which comprises mixing together a solvent and the following per 100 grams of the solvent:
   1 to 5 grams of ethylcellulose having a 45 to 50 percent ethoxyl content and a 95–110 cps. viscosity; and
   1 to 50 grams of discrete particles of unattached mixed nutrients which are less than 100 microns in size; heating the mixture to about 80°C. to dissolve the ethylcellulose in the solvent, allowing the system to cool during continued stirring whereby the ethylcellulose develops encapsulating walls around a plurality of discrete nutrient particles, and separating and recovering the nutrient-containing microcapsules in which the nutrients remain discrete.

2. A method as in claim 1 wherein the solvent is selected from the group of cyclohexane and hexane and mixtures thereof.

3. A method as in claim 2 wherein the solvent is cyclohexane.

4. A method according to claim 1 wherein the ethylcellulose has a 47.5% ethoxyl content and a 100 cps viscosity.

5. A method as in claim 1 wherein the system further comprises 1 to 5 grams of polyethylane granules having a molecular weight of 5,000 to 10,000.

6. A method according to claim 5 wherein the ethylcellulose has a 47.5% ethoxyl content and a 100 cps. viscosity and the polyethylene has a molecular weight of about 7,000.

7. A method according to claim 1 wherein the mixed nutrients amount to 10 to 40 grams.

8. A method according to claim 1 wherein the nutrients are added after the ethylcellulose has been brought into solution in the cyclohexane.

9. A method according to claim 1 wherein the nutrients are substantially all less than 50 microns in size.

10. The method of maintaining uniformity of a mixture of discrete nutrients while microencapsulating these nutrients which comprises mixing together cyclohexane and the following per 100 grams of cyclohexane:
    1 to 5 grams of ethylcellulose having a 45–50 percent ethoxyl content and a 95–110 cps. viscosity; and
    10 to 40 grams of discrete particles of unattached mixed nutrients which are less than 100 microns in size; heating the mixture to about 80°C. to dissolve the ethylcellulose in the cyclohexane, allowing the system to cool during the continued stirring whereby the ethylcellulose develops encapsulating walls around a plurality of discrete nutrient particles, and separating and recovering the nutrient containing microcapsules in which the nutrients remain discrete.

* * * * *